Oct. 21, 1969   E. S. SEELY   3,474,368
MAGNET CHARGING FIXTURE
Filed Aug. 1, 1967   2 Sheets-Sheet 1

INVENTOR
EARLE S. SEELY
BY
Rudolph J. Lurick
ATTORNEY

INVENTOR
EARLE S. SEELY
BY
Rudolph J. Jurick
ATTORNEY

United States Patent Office 3,474,368
Patented Oct. 21, 1969

3,474,368
MAGNET CHARGING FIXTURE
Earle S. Seely, Boonton, N.J., assignor to R F L Industries, Inc., Boonton, N.J., a corporation of New Jersey
Filed Aug. 1, 1967, Ser. No. 657,688
Int. Cl. H01f *13/00, 7/20*
U.S. Cl. 335—284
4 Claims

ABSTRACT OF THE DISCLOSURE

A magnet charging fixture to provide a plurality of magnetic poles on the face of a block of magnet material. A cylindrical, soft-iron pole piece, having longitudinal slots formed in one end thereof, is encircled by a copper conductor, portions of the conductor being disposed in the slots thereby to form a single turn conductor winding about the portions of the pole piece defined by the slots.

BACKGROUND OF THE INVENTION

The invention relates to a fixture for attachment to a magnet charger for the purpose of producing a plurality of uniform-strength magnetic poles in a block of magnet material having a plane surface.

In magnet charging apparatus of the type to which this invention is directed, a direct current pulse of high magnitude is passed through a copper conductor. The resulting high intensity magnetic field, which surrounds the conductor, is utilized to charge the magnet, which magnet is disposed in the magnetic field and oriented to provide desired magnetic poles. In the case of a ring or disc magnet, wherein it is desired to provide a plurality of magnetic poles on the flat surface thereof, a charging fixture, or adapter, is required. Generally, such fixture comprises a heavy copper conductor having a special configuration and magnetically coupled to a soft-iron pole piece. Certain multipole magnet charging fixtures heretofore available are constructed and arranged in such manner that the intensity of the magnetic field applied to discrete portions of the magnet is not uniform, thereby resulting in the formation of magnetic poles of unequal strength. In other prior charging fixtures, a more nearly uniform charging effect is obtained but at the sacrifice of efficiency, that is, an inordinantly heavy conductor and/or large charging current is required to charge modern magnet materials to the maximum value. In still other prior charging arrangements, the electric and/or magnet circuit of the fixture must be broken in order properly to position the magnet to be charged. This results in a mechanical arrangement which requires an appreciable amount of time to assemble and disassemble each time a magnet is to be charged, and if the electrical circuit is broken each time, care must be taken to provide a mechanical joint which offers no appreciable resistance to the charging current.

A magnet charging fixture made in accordance with this invention overcomes the shortcomings of prior devices and provides for a rapid charging of magnets with multiple magnetic poles of maximum and equal strength.

SUMMARY OF THE INVENTION

The magnet charging fixture comprises a continuous copper conductor having a generally cylindrical configuration and substantially enclosing a cylindrical, soft-iron pole piece. One end of the pole piece is divided into sectors defined by longitudinal slots and portions of the conductor are disposed within such slots so that each sector is substantially enclosed within a single turn of the conductor. The direction of current flow through the conductor is such that the magnetic field reverses direction from one pole piece sector to the next. The fixture includes means for supporting a magnet in proper orientation relative to the pole piece sectors, thereby to form a corresponding number of magnetic poles on a surface of the magnet upon the passage of a charging current through the conductor.

An object of this invention is the provision of an improved fixture for use with a magnet charger to form a plurality of equal-strength magnetic poles on the flat surface of a block of magnet material.

An object of this invention is the provision of a multipole magnet charging fixture for attachment to the contact bars of a magnet charger, which fixture comprises a cylindrical, soft-iron pole piece having longitudinal slots formed in one end thereof to define discrete sectors, and a continuous current conductor passing through the slots and about the peripheral surfaces of the sectors, the direction of current flow through the conductor being such that adjacent sectors are subjected to magnetic fields of opposite polarity.

The above-stated and other objects and advantages of the invention will become apparent from the following description when taken with the accompanying drawings. It will be understood, however, that the drawings are for purposes of illustration and are not to be construed as defining the scope or limits of the invention, reference being had tor the latter purpose to the claims appended hereto.

BRIEF DESCRIPTION OF THE DRAWINGS

In the drawings wherein like reference characters denote like parts in the several views.

Figure 1:
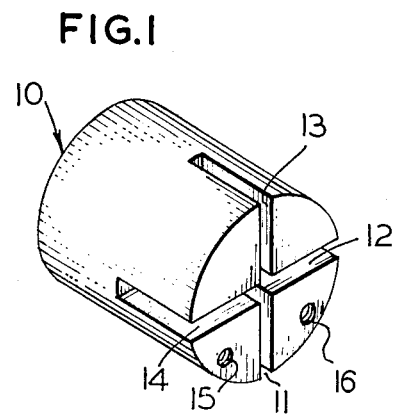
FIGURE 1 is an isometric view of the cylindrical soft-iron pole piece for a fixture made in accordance with this invention.

Reference now is made to FIGURE 1 showing the cylindrical, soft-iron pole piece 10 having mutually perpendicular, longitudinal slots formed in the forward end thereof. For purposes of references, the individual slots are identified by the numerals 11–14. These slots have a depth somewhat less than one-half the axial length of the pole piece. Also, formed in the forward end of the pole piece are two threaded holes 15 and 16.

Figure 3:
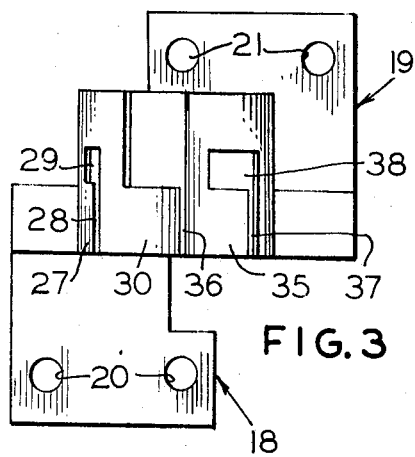
FIGURE 3 is a top plan view thereof.
Figure 2:
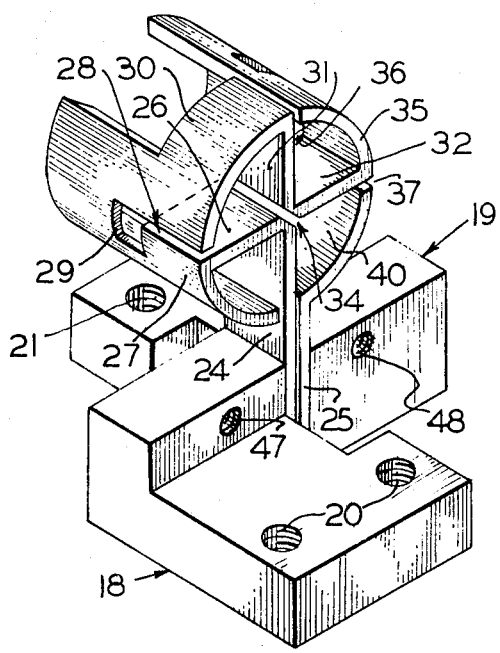
FIGURE 2 is an isometric view of the current conductor.

The copper, current conductor, shown in FIGURES 2 and 3, comprises a generally-cylindrical portion attached to a pair of similar mounting blocks 18 and 19. Each block is provided with a pair of holes 20 and 21, which holes receive mounting bolts by means of which the fixture is mechanically and electrically connected to the permanent contact bars of a magnet charger. The cylindrical portion of the conductor terminates in two vertical legs 24 and 25, said legs being spaced from each other and having lower ends brazed to the spaced, facing surfaces of the mounting blocks 18 and 19, respectively. The leg 24 is offset at a right angle to form the horizontal leg 26, which leg is joined to an arcuate leg 27 having an arcuate length somewhat less than 180 degrees, whereby the free end of such arcuate leg is spaced from the vertical leg 24. The axial width of the horizontal leg 26 is substantially equal to the depth of the slots formed in the soft-iron pole piece, see FIGURE 1, whereas the axial width of the arcuate leg 27 is substantially equal to that of the pole piece. Formed in the leg 27 is a longitudinal slot 28 terminating in a circumferential slot 29. At a point spaced clockwise from the slot 28, the rear end wall of the arcuate leg 28 is milled away to form a second arcuate leg 30, which leg is joined to a vertical leg 31 lying in the same plane as the vertical leg 24. This vertical leg 31 is offset at a right angle to form a second horizontal leg 32 lying in the same plane as the horizontal leg 26 and the proximate corners of the vertical legs 24 and 31 are leveled to form a gap 34. The horizontal leg 32 is joined to a third arcuate leg 35 having a free end spaced from the arcuate leg 30 to form a gap 36. It is here pointed out that the configuration of the arcuate leg 35 corresponds to that of the arcuate leg 27, that is, there is a longitudinal slot 37 formed in the leg 35 which slot terminates in a circumferential slot 38 (see FIGURE 3), and a portion of the leg 35 is milled away to form a fourth arcuate leg 40, said leg 40 being joined to the vertical leg 25.

The various slots and gaps formed in the conductor are for the purpose of defining a specific path for a direct current to flow through the conductor. More specifically, the direction of current flow from the mounting block 18 is upwardly through the vertical leg 24, to the left through the horizontal leg 26 and counter-clockwise through the arcuate leg 27. The current then flows around the circumferential slot 29, clockwise through the arcuate leg 30, downwardly through the leg 31, to the right through the leg 32, and counter-clockwise through the leg 35. The current then flows around the circumferential slot formed in the leg 35, clockwise through the arcuate leg 40, downwardly through the vertical leg 25 and through the mounting block 19. Considering the four quadrants into which the generally-cylindrical portion of the conductor is divided, it will be apparent that the conductor forms a substantially closed loop about each quadrant and that the direction of current flow through such loops is reversed from one loop to the next. Consequently, the magnetic fields, generated by the flow of current through the conductor, will be of reversed polarity in adjacent quadrants.

The three vertical legs 24, 31 and 25, the two horizontal legs 26 and 32, and the four arcuate legs 27, 30, 35 and 40, are all of equal axial length, which length preferably is somewhat less than the depth of the solts formed in the soft-iron pole piece (see FIGURE 1), and the inner walls of the arcuate legs lie on a circle having a diameter slightly greater than that of the pole piece. Also, the thickness of the vertical and horizontal legs is slightly less than the width of the pole piece slots.

Figure 4:
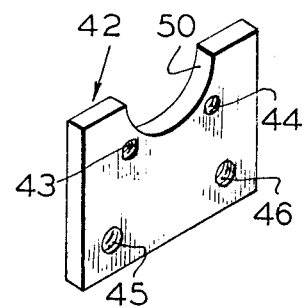
FIGURE 4 is an isometric view of the mounting plate.
Figure 5:
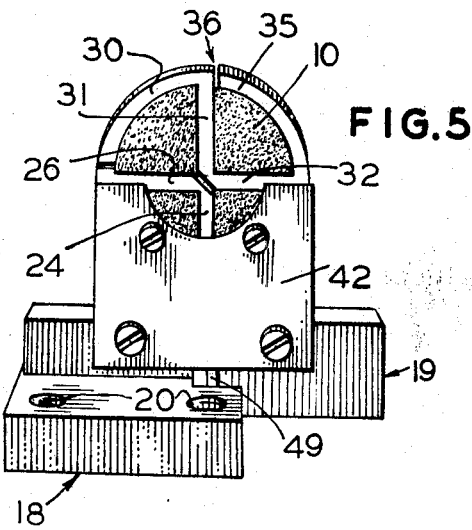
FIGURE 5 is an isometric front view showing the assembled fixture.
Figure 6:
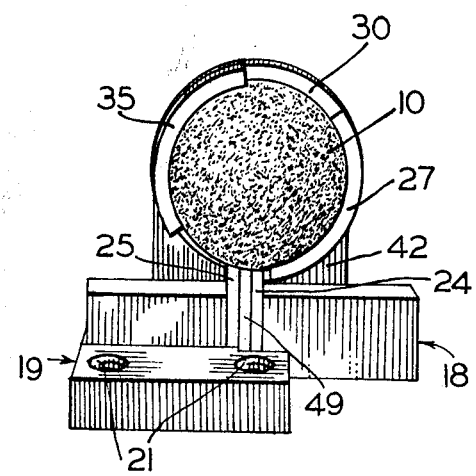
FIGURE 6 is a corresponding rear view thereof.
Figure 8:
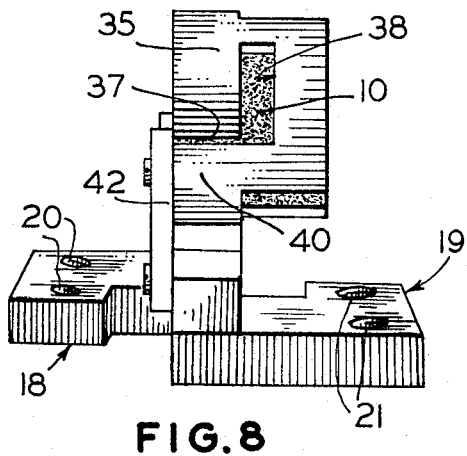
FIGURE 8 is a corresponding right side view thereof.
Figure 7:
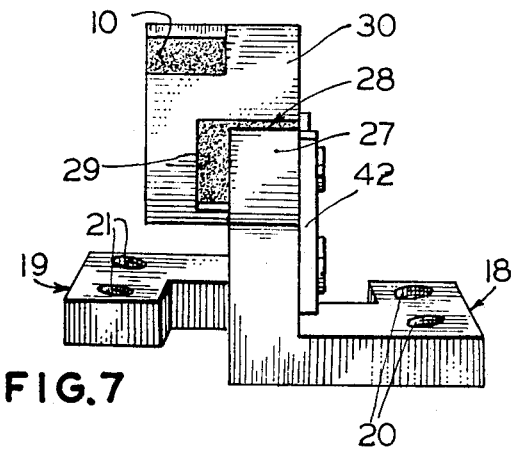
FIGURE 7 is a corresponding left side view thereof.

The pole piece is inserted into the cylindrical portion of the current conductor, from the rear thereof as viewed in FIGURE 2, with the flat, radially-extending conductor legs 24, 26, 31 and 32 disposed within the respective pole piece slots 11, 14, 13 and 12. The pole piece and the conductor are electrically isolated from each other either by means of thin, plastic shims inserted between adjacently-disposed surfaces or by means of a suitable insulating coating applied to such surfaces. A plastic mounting plate 42 (see FIGURE 4) is provided with two holes 43 and 44 positioned for alignment with the threaded holes 15 and 16 formed in the forward end of the pole piece (see FIGURE 1) and two holes 45 and 46 positioned for alignment with two threaded holes 47 and 48 formed in the mounting blocks 18 and 19, see FIGURE 2. The mounting plate is secured to the forward end of the pole piece and to the two mounting blocks by suitable screws as shown in the front view of FIGURE 5. Visible in front and rear views of FIGURES 5 and 6, respectively, is a plastic spacer plate 49 which electrically isolates the vertical conductor legs 24 and 25 from each other.

It will be noted that the mounting plate 42 has a semicircular recess 50 formed in the upper end thereof, said recess being symmetrically disposed with respect to the axis of the fixture. The radius of the recess 50 corresponds to that of a particular ring or disc magnet to be charged, such magnet being supported by the wall of the recess with a surface abutting the forward end of the pole piece. As stated hereinabove, the axial width of the radically-extending, flat legs of the conductor is somewhat less than the depth of the longitudinal slots formed in the pole piece. Thus, the forward, side edges of such legs are recessed below the forward end of the pole piece, thereby preventing shortcircuiting of the conductor legs by the magnet being charged. Alternatively, a thin coating of a suitable insulating material can be applied to the side edges of these legs to accomplish the same result. In the case of relatively thick magnets, a mounting plate of increased thickness is used, it being desirable to have the magnet supported solely by the mounting plate, thereby to minimize the overall time required to charge a plurality of magnets one by one. In the case of magnets having a square or rectangular configuration, the recess in the mounting plate is of corresponding shape.

The described current conductor, preferably made of a plurality of sections brazed together, results in the formation of four magnetic poles on the flat surface of the magnet, like poles being spaced along a diameter. It will be apparent, however, that the configuration of the fixture can be extended to form six, eight, or more magnetic poles on the surface of the magnet. Since the working pole piece sectors each are substantially completely encircled by the current conductor, the magnetic poles formed on the magnet are of equal strength.

Having now described the invention, those skilled in this art will be able to make various changes and modifications without thereby departing from the spirit and scope of the invention as recited in the following claims.

I claim:
1. A fixture for use with a magnet charger comprising,
    (a) a solid, cylindrical, soft-iron pole piece having a plurality of intersecting longitudinal slots formed in the forward end thereof and defining an even number of equal sectors,
    (b) a pair of spaced mounting blocks,
    (c) a continuous current conductor having ends connected to said blocks, flat leg portions disposed within said recesses and arcuate leg portions substantially coextensive with and encircling the outer walls of all of the said sectors, and
    (d) means electrically insulating the pole piece from the conductor; the recited arrangement being such that the conductor forms a substantially closed loop around each of the sectors and the magnetic field generated by the flow of current through the conductor is of reverse polarity in adjacent sectors.
2. The invention as recited in claim 1, wherein the forward side walls of the said leg portions of the conductor are recessed from the said forward end of the pole piece.
3. The invention as recited in claim 1, including a support member secured to the fixture, said support member including means for supporting a magnet symmetrically with respect to the axis of the pole piece and proximate to the said forward end thereof.
4. The invention as recited in claim 3, wherein the said support member is a flat plate of insulating material secured to the forward end of the pole piece and having a recess formed in one end thereof, the wall of said recess constituting a support for the magnet.

References Cited

UNITED STATES PATENTS 2,962,637   11/1960   Janicke _____ 335—284

BERNARD A. GILHEANY, Primary Examiner

DEWITT M. MORGAN, Assistant Examiner